United States Patent
Loewen (10) Patent No.: US 11,420,489 B2
(45) Date of Patent: Aug. 23, 2022

(54) HEIGHT ADJUSTABLE IMPLEMENT MOUNT FOR SINGLE-POINT HITCH EQUIPPED VEHICLES

(71) Applicant: Lionforge Industries Inc., Ste. Genevieve (CA)

(72) Inventor: Jonathan S. Loewen, Ste. Anne (CA)

(73) Assignee: Lionforge Industries Inc., Ste. Genevieve (CA)

( * ) Notice: Subject to any disclaimer, the term of this patent is extended or adjusted under 35 U.S.C. 154(b) by 221 days.

(21) Appl. No.: 16/864,832

(22) Filed: May 1, 2020

(65) Prior Publication Data

US 2020/0346505 A1 Nov. 5, 2020

Related U.S. Application Data

(60) Provisional application No. 62/842,004, filed on May 2, 2019.

(51) Int. Cl.
| | |
|---|---|
| *B60D 1/46* | (2006.01) |
| *B60D 1/64* | (2006.01) |
| *B60D 1/36* | (2006.01) |

(52) U.S. Cl.
CPC ............. *B60D 1/465* (2013.01); *B60D 1/363* (2013.01); *B60D 1/64* (2013.01)

(58) Field of Classification Search
CPC .......... B60D 1/363; B60D 1/465; B60D 1/64
USPC ......................................................... 280/477
See application file for complete search history.

(56) References Cited

U.S. PATENT DOCUMENTS

| | | | | |
|---|---|---|---|---|
| 6,321,851 B1 * | 11/2001 | Weiss | ................... | A01B 59/062 280/477 |
| 2005/0028406 A1 * | 2/2005 | Elliott | ................... | B62D 49/065 37/232 |

\* cited by examiner

*Primary Examiner* — Kevin Hurley
*Assistant Examiner* — Felicia L. Brittman
(74) *Attorney, Agent, or Firm* — Kyle R. Satterthwaite; Ryan W Dupuis; Ade & Company Inc (57) ABSTRACT

An implement mount for height adjustable mounting of an implement to a vehicle. The mount features a hitch coupler for mating with a single-point hitch of the vehicle to reach longitudinally therefrom, and a guide frame defining at least one guide slot lying transverse to the longitudinal direction of the hitch coupler in an upright orientation. At least one link arm is pivotally supported on the hitch coupler, and an implement carrier is coupled to the link arm proximate a rear end thereof. A follower arrangement is engaged between the link arm and the guide slot to constrain movement of the implement carrier to movement along the guide slot. Pivotal movement of the link arm in a first direction lifts the implement carrier along the guide slot, while pivotal moment in a second direction lowers the implement carrier along the guide slot.

20 Claims, 13 Drawing Sheets

HEIGHT ADJUSTABLE IMPLEMENT MOUNT FOR SINGLE-POINT HITCH EQUIPPED VEHICLES

CROSS-REFERENCE TO RELATED APPLICATIONS

This application claims benefit under 35 USC 119(e) of U.S. Provisional Patent Application No. 62/842,004, filed May 2, 2019

FIELD OF THE INVENTION

The present invention relates generally to mounting of work implements to vehicles, and more particularly to mounting of such implements to vehicles with a single-point hitch that lacks means for height adjustment of the implement.

BACKGROUND

There exists a desire to install various working implements to ATVs, UTVs, garden tractors, or pickup trucks that are not equipped with height-adjustable three-point hitches like those found on agricultural tractors. Instead, such vehicles are typically equipped with a single-point hitch, for example in the form of a standard hitch receiver to which a removable drawbar can be selectively pinned to enable towing of a trailer or other towed implement. Accordingly, the factory hitches of these vehicles are unsuitable for use with implements that need to be raised and lowered between transport and working positions, or that benefit from such height adjustment for the purpose of adjusting a working height at which the implement rides over the ground (e.g. a mower), or adjusting a working depth or down pressure at which the implement penetrates or presses the ground (e.g. a disc coulter, harrow, land roller, etc.).

Existing products intended to address this need for height-adjustable mounting to a single-point hitch include a One Point Lift System marketed by Impact Implements, and another Implement Lift marketed by Black Boar Implements, each of which employs a parallelogram linkage operated by a manual crank or powered actuator.

However, there remains room for improved and alternative designs, and applicant has designed a new height-adjustable single-point implement mount to address this need in the marketplace.

SUMMARY OF THE INVENTION

According to one aspect of the invention, there is provided an implement mount for height adjustable mounting of an implement to a vehicle with a single-point hitch, said mount comprising:

a hitch coupler having a front end configured to mating with the single-point hitch of the vehicle to connect the mount thereto in a working position in which the hitch coupler reaches outward from the vehicle in a longitudinal direction;

a guide frame affixed to the hitch coupler and defining at least one guide slot lying transversely cross-wise to the longitudinal direction of the hitch coupler in an upright orientation at distance spaced longitudinally rearward from the front end thereof;

at least one link arm pivotally supported on the hitch coupler at a pivot point located intermediately between the at least one guide slot and the front end of the hitch coupler;

an implement carrier coupled to the at least one link arm proximate a rear end thereof at a spaced distance from the pivot point, said implement carrier carrying, or being configured to carry, the implement; and a follower arrangement engaged between the at least one link arm and the at least one guide slot proximate the rear end of the at least one link arm to constrain movement of the implement carrier to movement along said at least one guide slot;

wherein pivotal movement of the at least one link arm in a first direction lifting the rear end thereof upwardly is operable to lift the implement carrier along the at least one guide slot, and pivotal moment of the at least one link arm in a second direction lowering the rear end thereof is operable to lower the implement carrier along the at least one guide slot.

BRIEF DESCRIPTION OF THE DRAWINGS

Preferred embodiments of the invention will now be described in conjunction with the accompanying drawings in which.

DETAILED DESCRIPTION

Figure 1:
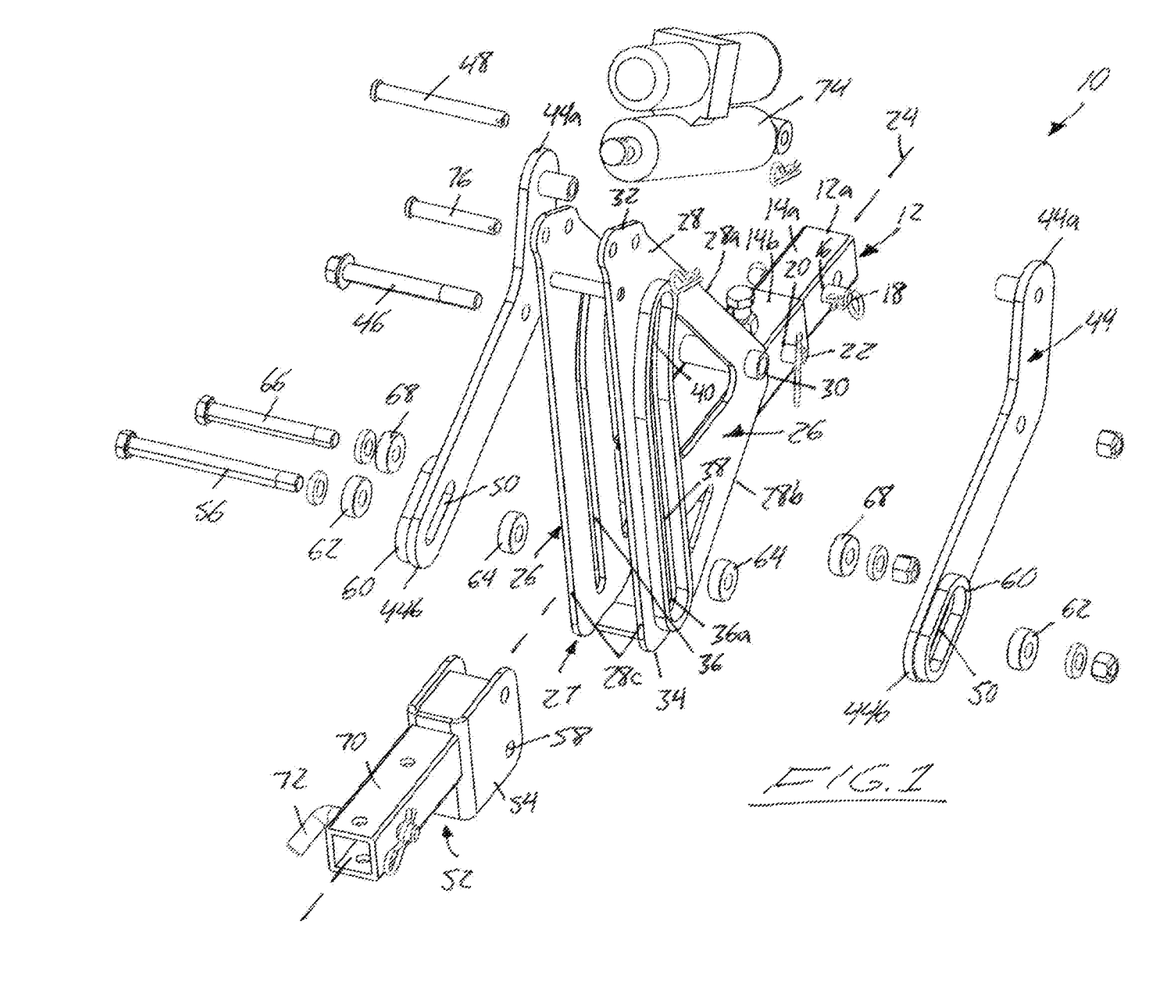
FIG. 1 is a partially exploded perspective view of an inventive implement mount for connection to a hitch receiver of a vehicle to mount an implement thereon in height-adjustable fashion.

FIG. 1 shows an implement mount 10 according to one embodiment of the invention. The mount features a hitch coupler 12 in the form of a telescopically length-adjustable drawbar having a front shank section 14a slidably received in a hollow rear section 14b. The front shank section 14a defines a proximal front end 12a of the hitch coupler that is slidably receivable in a hitch receiver of a single-point vehicle hitch, whether on an ATV, UTV, garden tractor, pickup truck or other vehicle. The front shank section 14a thus features one or more horizontal lock holes 16 passing transversely therethrough near the front proximal end 12a of the hitch coupler 12 for alignment with a corresponding lock hole in the hitch receiver to enable securement of the hitch coupler 12 thereto via a locking pin 18. Another series of horizontal pin holes likewise penetrate transversely through the front shank section 14a, for selective alignment of any such pin hole with a corresponding pin hole 20 in the hollow rear section 14b of the hitch coupler 12 to enable locking of the front shank section thereto with another locking pin 22. This enables locking of the front drawbar section 14a at various degrees of extension to vary the overall length of the hitch coupler 12 between the front proximal end 12a thereof, and a rear distal end thereof that resides opposite thereto in a longitudinal direction denoted by a central longitudinal axis 24.

Affixed to the hollow rear section 14b of the hitch coupler 12 at opposing lateral sides thereof are two frame members 26 of matching and aligned shape and position to one another. These frame members cooperatively form a stationary guide frame 27 of the mount, which is used to constrain movement of other movable components, as described in more detail below. In the illustrated embodiment, each frame member 26 features a flat plate 28 of generally triangular shape welded to the respective side of the rear section 14b of the hitch coupler 12. A front end of the plate 28 corresponds to a first vertex 30 of its generally triangular shape, and resides at matching elevation to the hitch coupler 12 against the respective side wall of the hollow rear section 14b thereof. From this front vertex 30, a first perimeter edge 28a of the plate's triangular shape angles upwardly and rearwardly to a rear upper vertex 32, while a second perimeter edge 28b also emanating from the front vertex 30 angles downwardly and rearwardly to a rear lower vertex 34. The third and final perimeter edge 28c of the plate's generally triangular shape has an upright orientation and spans between the rear upper and lower vertices 32, 34 at a position situated beyond the rear end of the hitch coupler 12.

A guide slot 36 in the triangular plate 28 of each frame member 26 runs along the upright third perimeter edge 28c at a short distance inwardly therefrom at a position also situated rearwardly beyond the rear end of the hitch coupler 12. The upright guide slot 36 features a vertical lower section 38 that lies perpendicularly to the longitudinal axis 24 and spans from a lowermost terminal end 36a of the slot, near the rear lower apex 34 at an elevation below the hitch coupler, to a point of elevated position where the hitch coupler 12. From this elevated point, the slot then transitions into a curved upper section 40 that arcs forwardly and upwardly to an uppermost terminal end 36b of the slot near the rear upper apex 32. A boundary wall 42 projects laterally from the plate 28 at the outer face thereof opposite the hitch coupler 12, and surrounds an entirety of the slot on a conforming path therearound at a short distance outward therefrom.

A pair of link arms 44 of matching and aligned shape and position to one another also reside on opposite sides of the hitch coupler 12, and reside outside the two frame members 26 of the guide frame 27. The link arms 44 are pivotally pinned to the guide frame 27 by a pivot pin 46 passing through the plates 28 of the frame members 26 just above the rear section 14a of the hitch coupling near the front apexes 30 of the frame member plates. Accordingly, the links arms 44 are pivotally carried on the hitch coupler 12 for pivotal movement about a horizontal pivot axis lying perpendicularly transverse to the longitudinal axis 26 at a pivot point situated intermediately between the front and rear ends of the hitch coupler, and near the front end of the guide frame 27. Each link arm 44 has an elongated shape with a front end 44a situated forwardly of the pivot point, and an opposing rear end 44b situated rearwardly of the pivot point near the upright edges 28c of the frame members at the rear end of the frame.

The link arms 44 are joined together by a coupling pin 48 near their front ends 44a at a location above the hitch coupler 12. Near the rear end 44a, each link arm 44 features a mounting slot 50 lying radially of the pivot axis of the pivot pin 46. It is through these mounting slots 50 that pinned mounting of an implement carrier 52 to the link arms 44 is accommodated via the guide slots 36. The implement carrier 52 features a support body 54 that resides between the two frame members 26 of the guide frame 27 at the slotted areas thereof situated rearwardly beyond the hitch coupler 12. A first follower pin 56 passes through a horizontally transverse bore 58 in the support body 54, and through the guide slots 36 of the frame members 26 and the mounting slots 50 of the link arms 44, thereby suspending the support body 54 from the follower pin 56 in a manner constraining movement of the implement carrier 52 to upward and downward movement along the guide slots 36 during pivotal movement of the link arms 44.

Like the guide slots 36 in the guide frame, the mounting slots 50 in the link arms 44 are also surrounded by conformingly shaped boundary walls 60 projecting laterally outward from the outer faces of the link arms 44. To ensure smooth action during the movement of the link arms and implement carrier, the follower pin 56 features a pair of outer rollers 62 rotatably journaled thereon near the ends thereof in rolling contact with the boundary walls 60 of the mounting slots 50 on the outer side of the link arms 44. The follower pin 56 also features a pair of inner rollers 64 situated inwardly from the outer rollers between the link arms 44 and the frame member plates 28 in rolling contact with the boundary walls 42 of the guide slots 36 on the outer side of the guide frame members 26. The mounting slots 50 in the link arms accommodate the differential constraints imposed by the arc-shaped travel path of the link arms about their pivot point, and the partially linear, partially curved travel path imposed by the guide slots 36.

To constrain an orientation of the implement carrier 52 during its travel along the guide slots 36, an additional follower pin 66 passes through a second transverse bore in the support body 54 of the implement carrier 52, and through the two guide slots 36 of the guide frame 27. This additional follower pin 66 rotatably carries an additional set of rollers 68 near its ends at locations between the link arms and the frame member plates 28 to also reside in rolling contact with the boundary walls 42 of the guide slots 36 on the outer side of the guide frame members 26. A female receiver tube 70 of the implement carrier 52 projects rearwardly from the support body 54 to receive a male shank of an implement for pinned securement thereto by insertion of lock pin 72 through aligned lock bores in the carrier's receiver tube 70 and the implement's shank. A longitudinal axis 71 of the receiver tube 70 lies perpendicular to an axis on which the transverse bores of the support body 54 are spaced from one another. Accordingly, when the implement carrier 52 rides along the vertical lower section 38 of the guide slots 36 of the guide frame, the receive tube 70 projects horizontally rearward therefrom in parallel relation to the longitudinal axis 24 of the hitch coupler 12.

Movement of the implement carrier 52 through this vertical range in the lower section 38 of the guide slots 36 thus causes vertical displacement of the attached implement, without any angular pitching movement thereof. However, when the implement carrier 52 rides up into the curved upper section 40 of the guide slots 36, the top follower pin 66 will ride forwardly therein, thus pitching the implement carrier 52 and attached implement forwardly and upwardly. Accordingly, vertical displacement along the vertically linear lower section 38 of the guide slots can be used to set a working height, down-pressure or ground penetrating depth of the implement, while maintaining a consistent implement orientation, while the curved upper section 40 of the guide slots pitches the implement upwardly and forwardly into a tilted transport position of enhanced ground clearance.

The implement mount of FIGS. 1 through 5 employs a powered actuator 74 to perform pivotal movement of the lift arms 44 and thereby lift and lower the implement carrier 52 and attached implement. The powered actuator may, for example, be a hydraulic actuator, or electric linear actuator. One end of the actuator is pivotally coupled to the lift arms 44 near the front ends 44a thereof by the coupling pin 48, and the other end of the actuator is pivotally coupled to the guide frame 27 by a cross-pin 76 at an elevated location thereon well above the hitch coupler 12, near the rear upper vertices 32 of the frame members. Extension of the actuator 74 thus drives the front ends 44a of the link arms 44 downwardly about the pivot pin 46, thereby raising the rear ends 44b of the link arms in order to lift the implement carrier 52 and attached implement. Collapse of the actuator instead lifts the front ends 44a of the link arms 44 upwardly about the pivot pin 46, thereby lowering the rear ends 44b of the link arms in order to lower the implement carrier 52 and attached implement.

Figure 2:
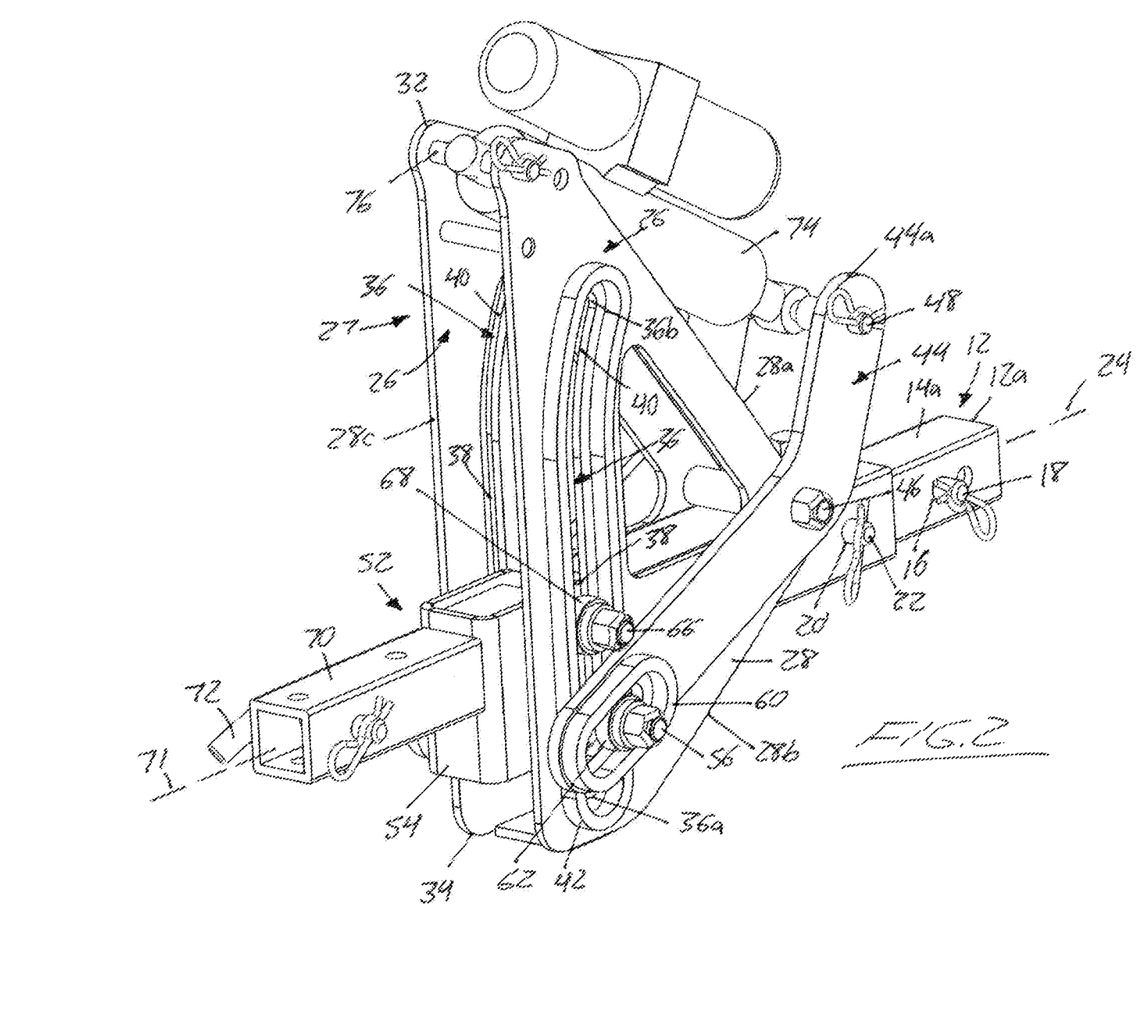
FIG. 2 is an assembled perspective view of the implement mount of FIG. 1 in an in-line working state.
Figure 3:
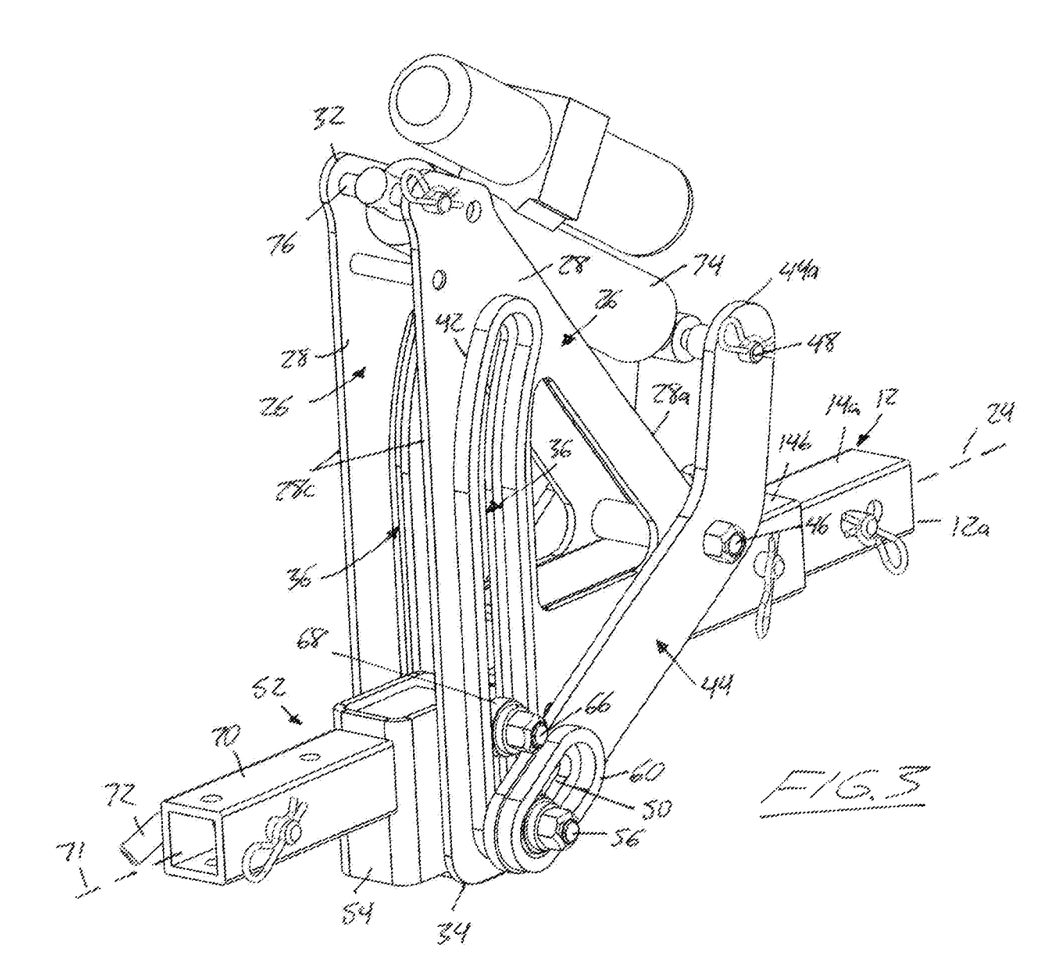
FIG. 3 is an assembled perspective view of the implement mount of FIG. 1 in a lowered working state

FIG. 2 shows the implement mount in an in-line state placing the axis 71 of the implement carrier's receive tube 70 in alignment with the longitudinal axis 24 of the hitch coupler 12, thus placing the attached implement at the same level it would reside at if coupled directly to the vehicle's hitch receiver without the implement mount of the present invention. FIG. 3 shows the implement mount in a lowered state placing the axis 71 of the implement carrier's receiver tube 70 at a lowered elevation below the longitudinal axis 24 of the hitch coupler 12, thus lowering the implement into closer relation, higher pressure or deeper engagement with the ground, depending on the type of implement (e.g. a mower that always resides above ground level, versus tillage equipment, ditchers, or other ground working implements intended to engage into the earth).

Figure 4:
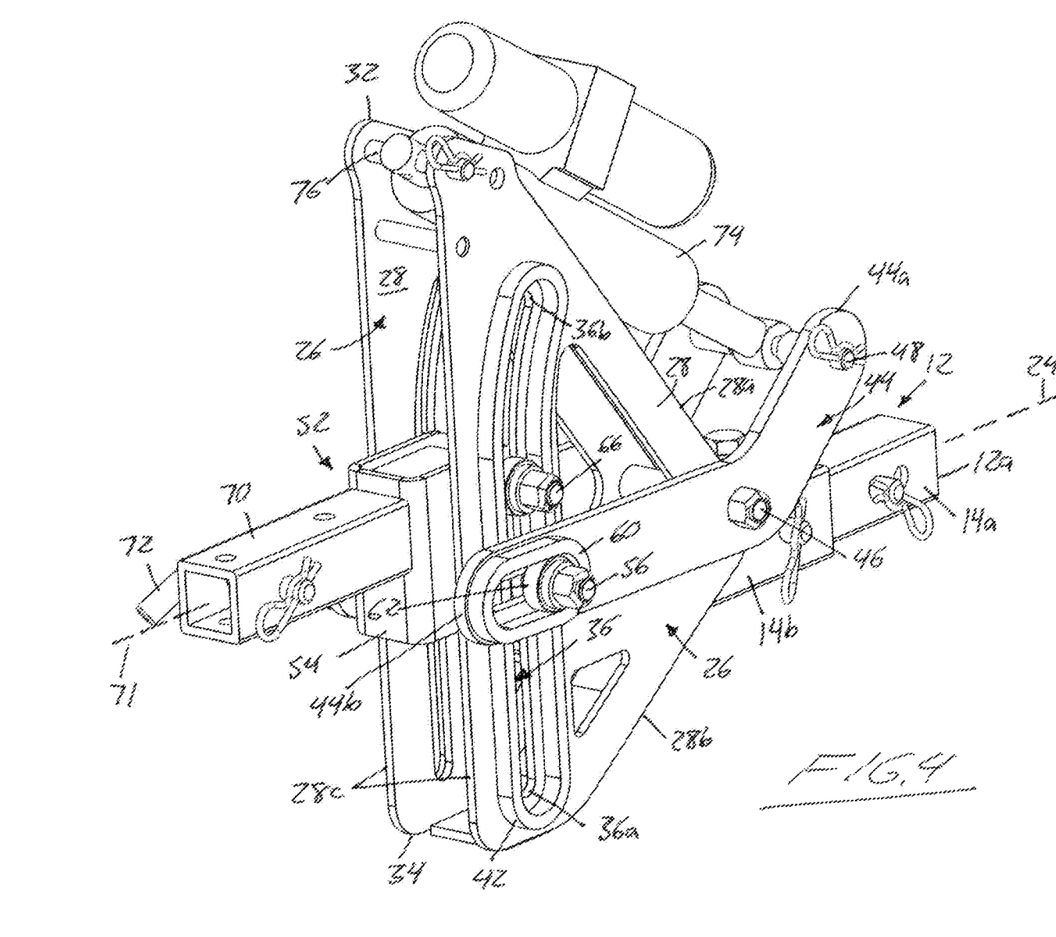
FIG. 4 is an assembled perspective view of the implement mount of FIG. 1 in a partially raised working state.
Figure 5:
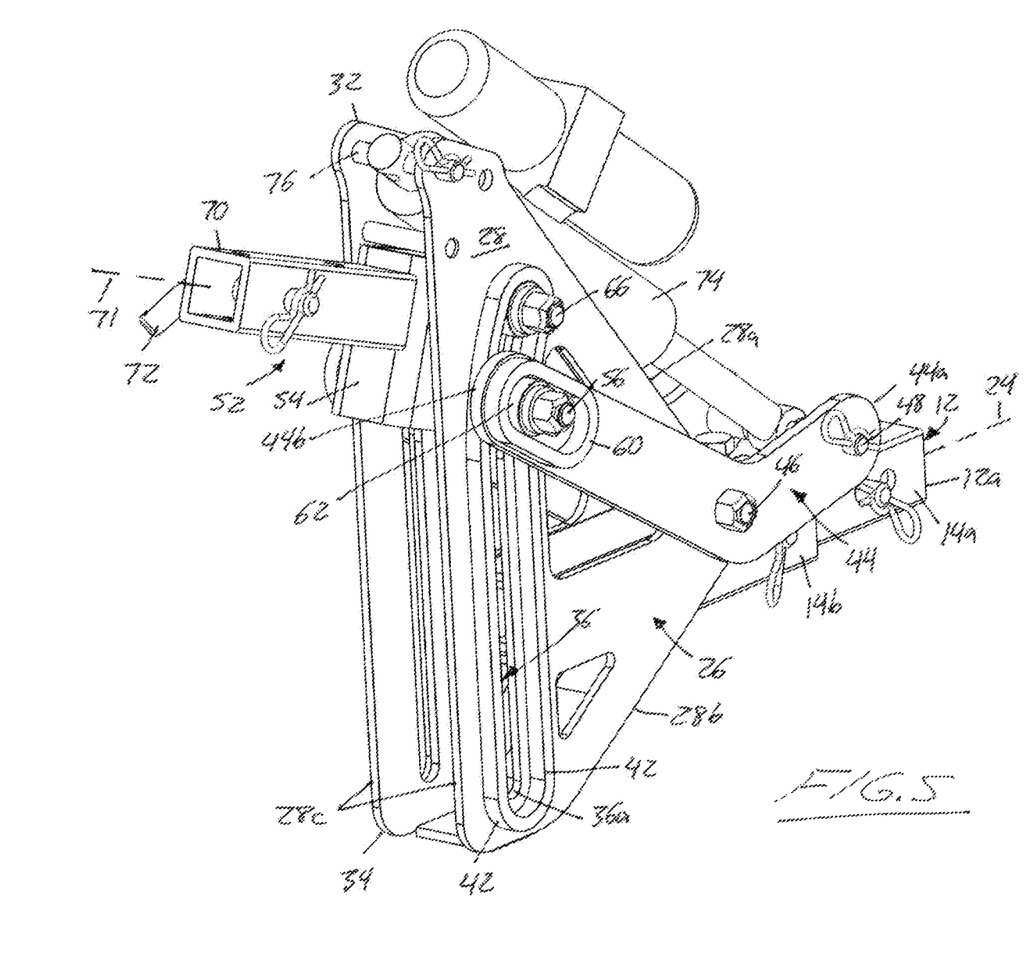
FIG. 5 is an assembled perspective view of the implement mount of FIG. 1 in a fully raised transport state.

FIG. 4 shows the implement mount in partially raised working state placing the axis of the implement carrier's receive tube 70 at a partially raised elevation above the longitudinal axis of the hitch coupler 12, thus raising the implement into further spaced relation above the ground, while maintaining a normal working orientation thereof since the implement carrier remains in the vertical lower section of the guide slots to maintain a horizontal orientation of the carrier's receiver tube 70. FIG. 5 shows the implement mount in a fully raised transport state placing the axis of the implement carrier's receive tube 70 at a maximum elevation above the longitudinal axis of the hitch coupler 12, and in obliquely oriented relation thereto, thus pitching the attached implement upwardly forward into a raised and tilted transport position of maximum ground clearance.

Figure 6:
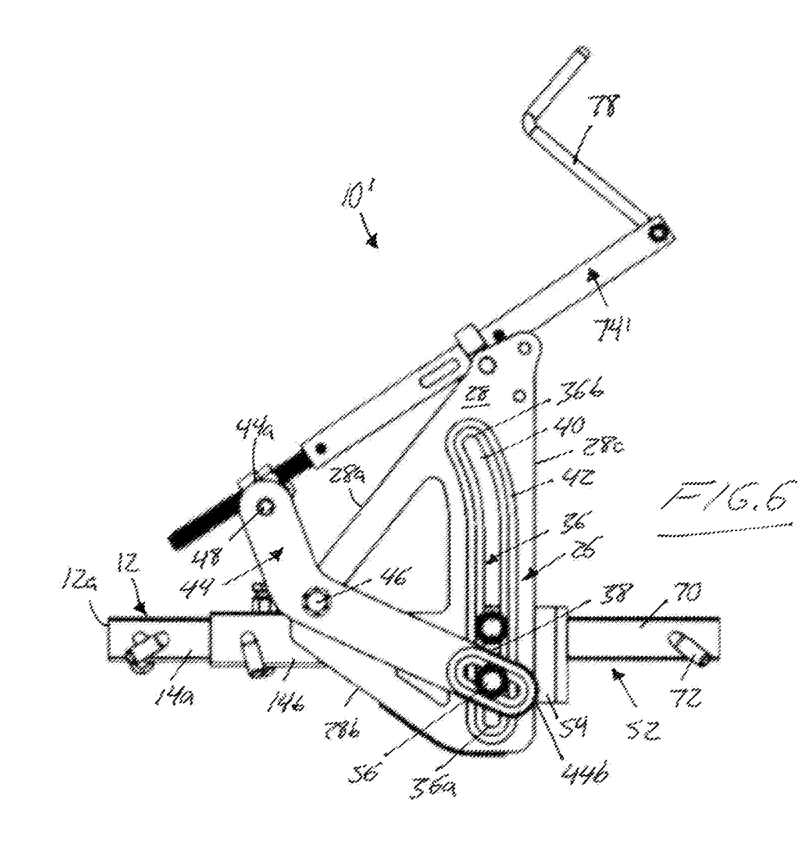
FIG. 6 is an assembled side view of a first variant of the implement mount in the in-line working state.
Figure 7:
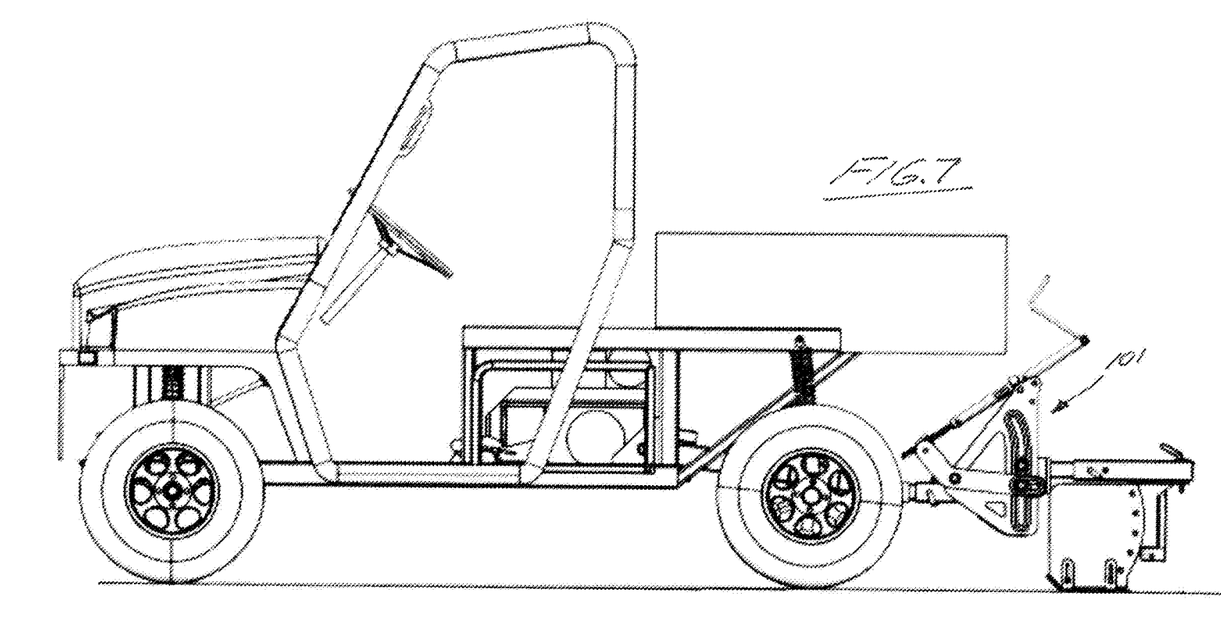
FIG. 7 is a side view illustrating use of the implement mount of FIG. 6 in the in-line working state.
Figure 8:
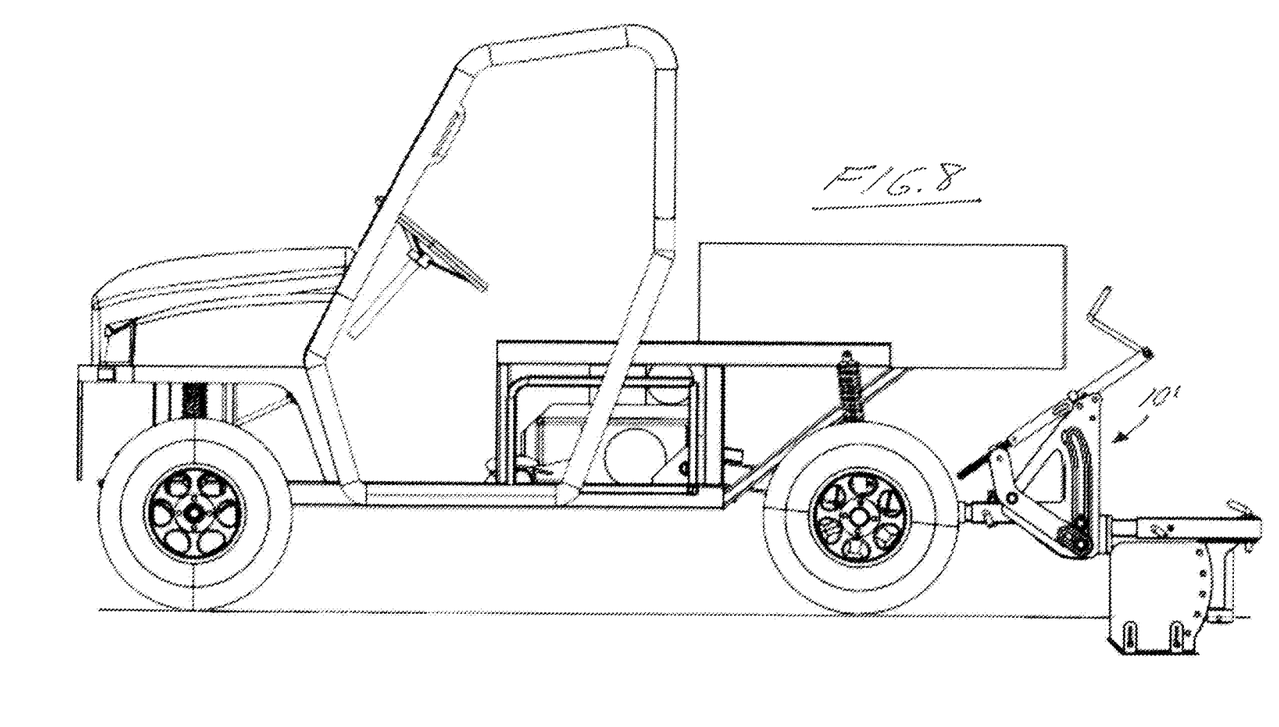
FIG. 8 is a side view illustrating use of the implement mount of FIG. 6 in the lowered working state.
Figure 9:
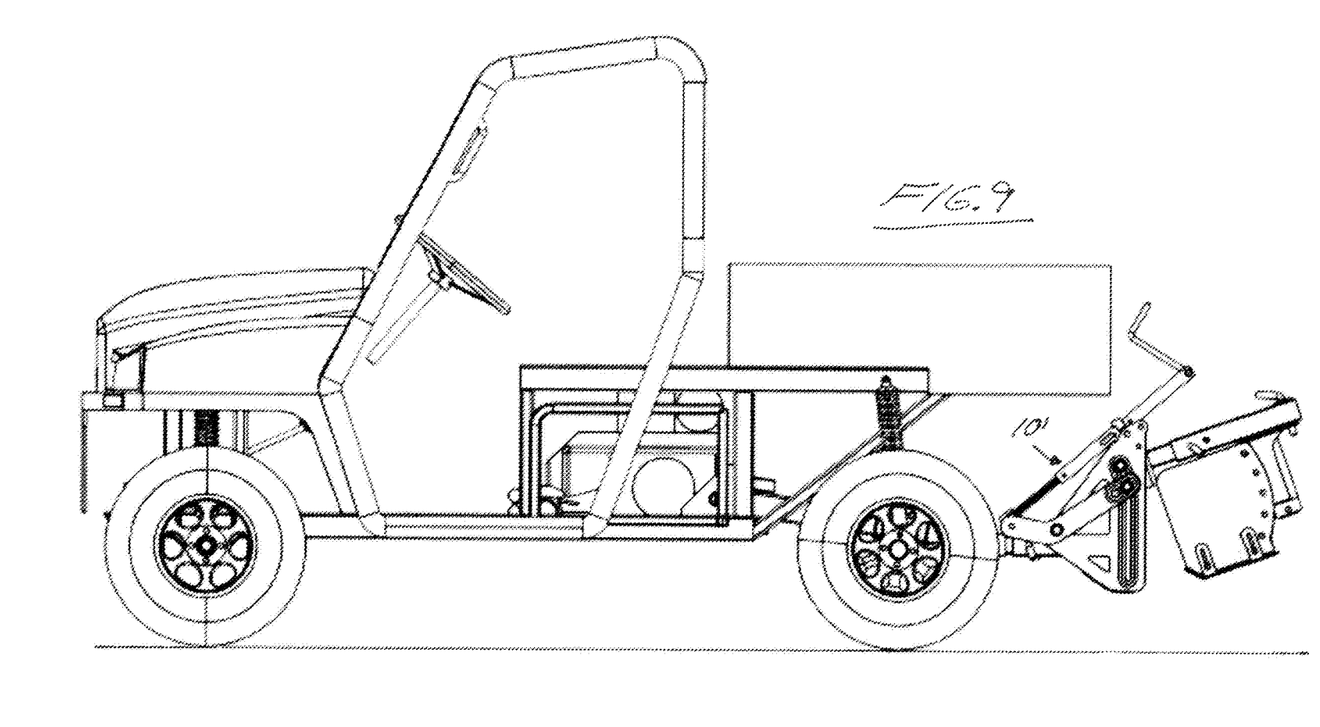
FIG. 9 is a side view illustrating use of the implement mount of FIG. 6 in the fully raised transport state.
Figure 10:
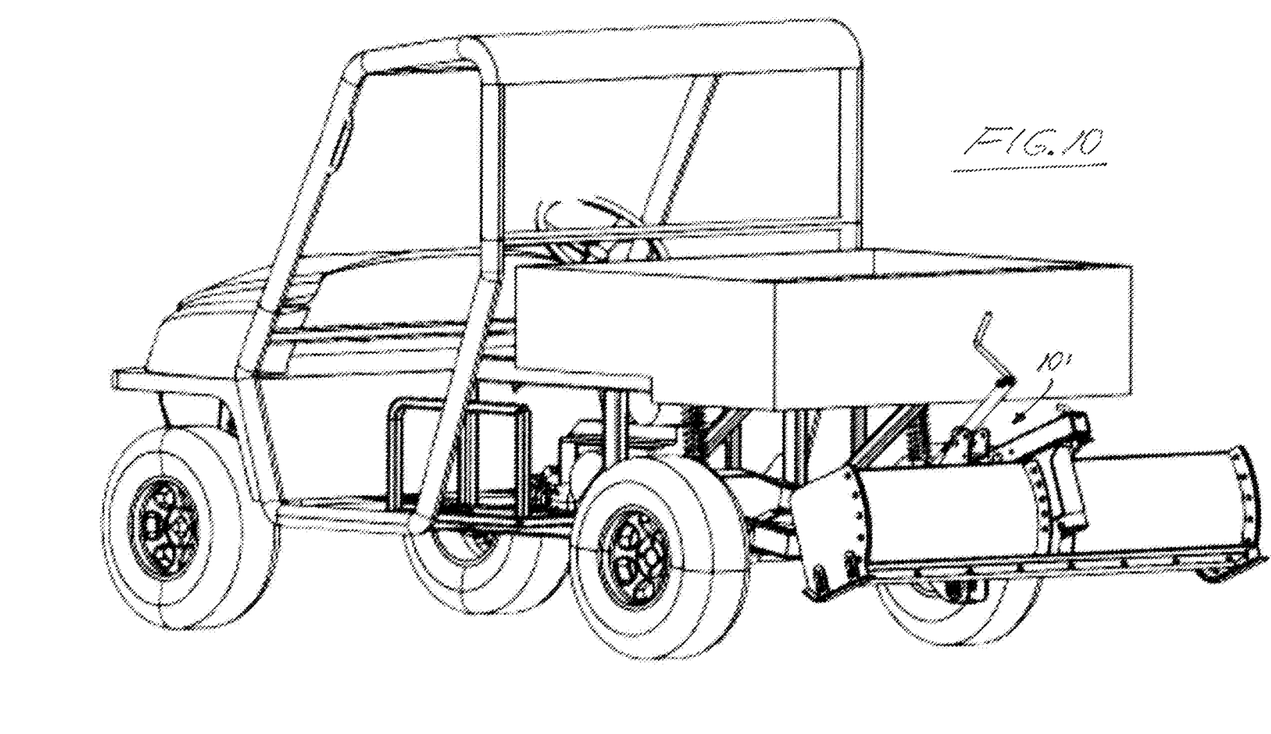
FIG. 10 is a rear perspective view illustrating use of the implement mount of FIG. 9.

FIG. 6 illustrates a variant of the implement mount 10', differing only in that a manually operated actuator 74' is substituted for the powered actuator shown in FIGS. 1 to 5. Operation of a hand crank 78 of the actuator 74' in opposing directions is operable to expand and collapse the actuator, thus lifting and lowering the implement carrier and attached implement in the same manner described above. FIG. 6 shows the manually operated variant in isolation, and in the same in-line working state shown in FIG. 2 for the powered version. FIG. 7 shows the same implement mount 10' as FIG. 6, but installed on a UTV to carry an implement, in this case a box blade, thereon. FIG. 7 shows the in-line working state, in this case placing the box blade flush with the ground, for example to perform a levelling operation. FIG. 8 shows the lowered state of the mount, thus applying down force and penetrating the ground with the box blade, for example for trenching purposes. FIGS. 9 and 10 show the fully raised transport state of the mount, thus lifting and tilting the box blade forward for maximum ground clearance during transport of the implement from one working location to another, or to enable non-working use of the vehicle without having to detach the implement or mount.

The optional use of a telescopically adjustable drawbar for the hitch coupler enables the mount's longitudinal reach from the vehicle hitch to be varied to suit the particular vehicle. For example, lengthening of the drawbar may be required on some vehicles to accommodate the fully raised transport state in which the implemented is tilted forwardly. On some vehicles, the rear end design may interfere with such forward tilting if the hitch coupler was of a short, fixed length.

Figure 11:
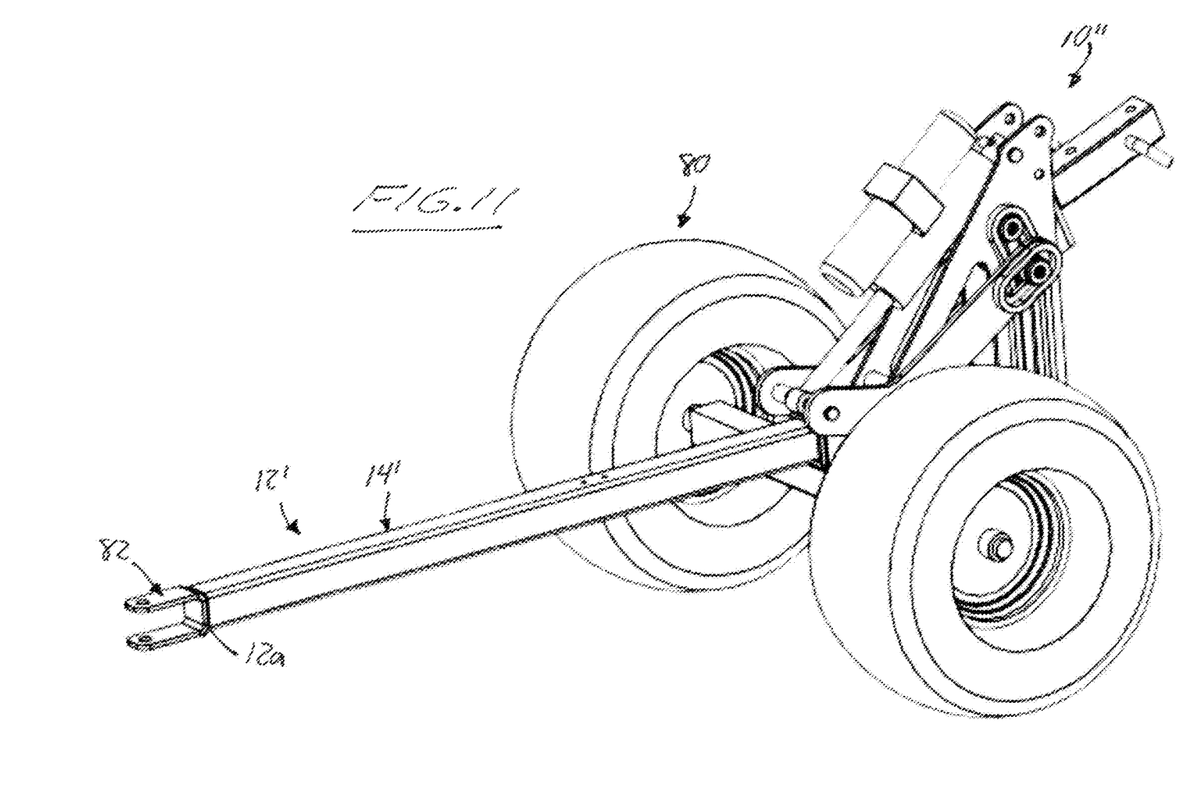
FIG. 11 is an assembled perspective view of a second variant of the implement mount, which is reconfigured to towed conveyance.
Figure 12:
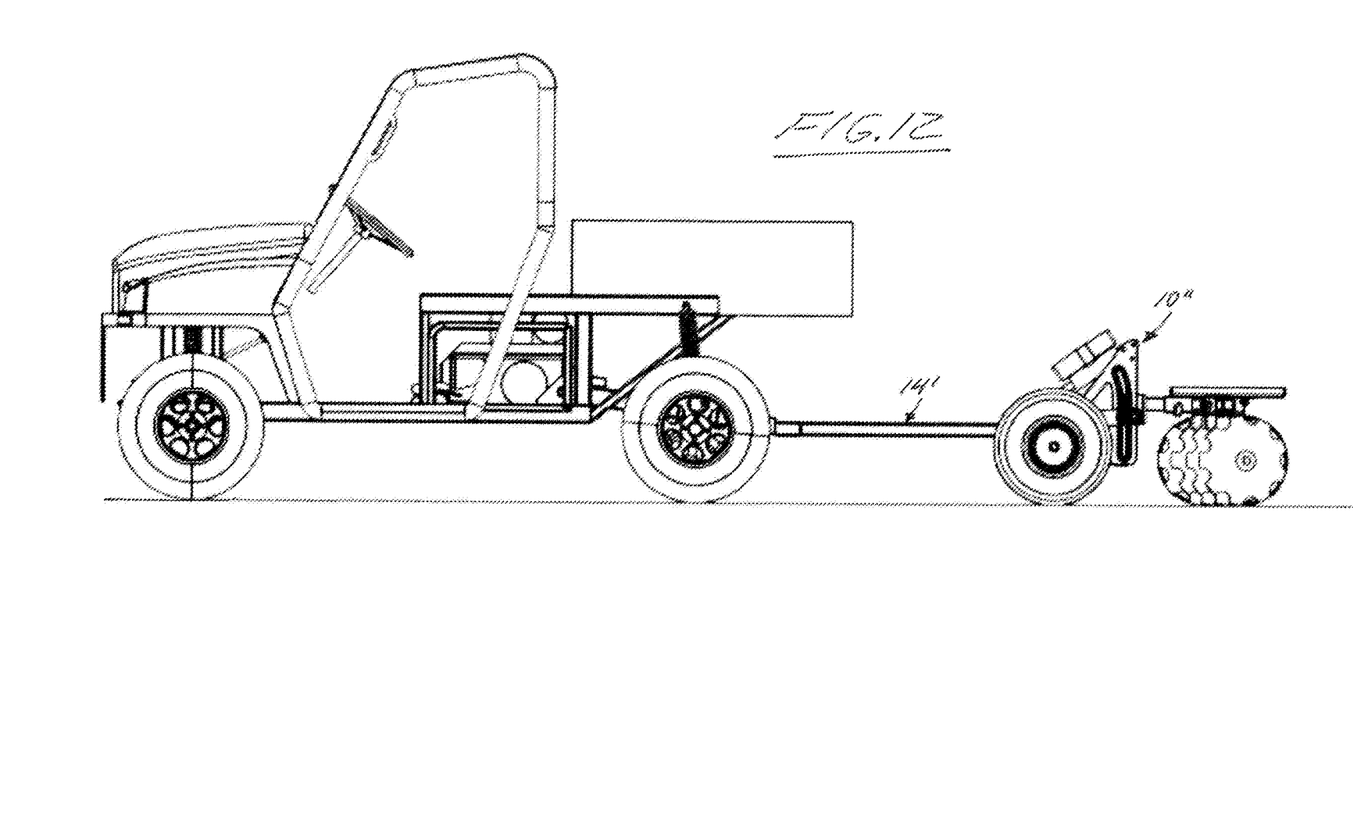
FIG. 12 is a side view illustrating use of the implement mount of FIG. 11 in the in-line working state.
Figure 13:
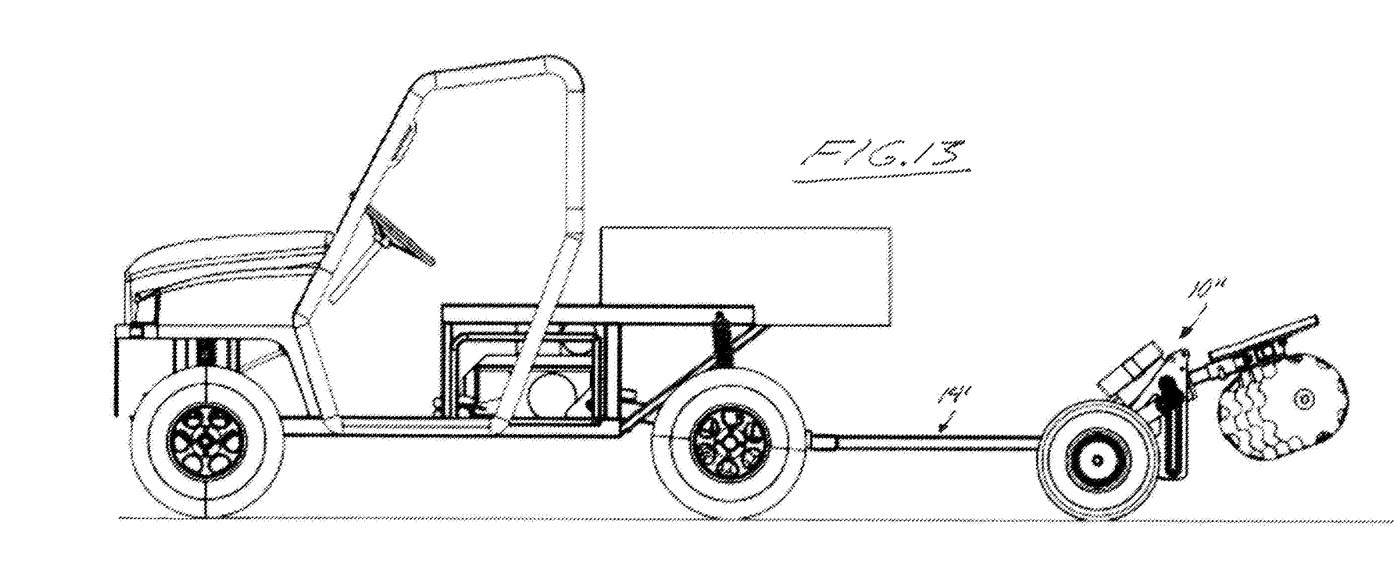
FIG. 13 is a side view illustrating use of the implement mount of FIG. 11 in the fully raised transport state.

FIG. 11 shows another variant of the implement mount, in which the hitch coupler 12', instead of a telescopically adjustable drawbar, is an elongated pull tongue 14' having a pair of ground wheels 80 rotatably mounted thereto on opposite sides thereof near the guide frame, and having a suitable hitch connector 82 at the front proximal end 12a to enable connection to a towing drawbar of the vehicle. In this embodiment, the operation of the lift arms thus lifts and lowers the implement carrier and attached implement relative to the ground wheels of the towed implement mount. Accordingly, the present invention can be used in both direct mount and towed implement contexts. FIGS. 12 and 13 show the towed implement mount 10" coupled to a towing drawbar of a UTV for the purpose of towing a disc coulter in height-adjustable fashion behind the vehicle. FIG. 12 shows the in-line working state with the discs engaged with the ground, while FIG. 13 shows the fully raised transport state with the disc coulter lifted and tilted forwardly for maximum ground clearance during transport. The mounted versions in FIGS. 1 through 10 may be converted to the towed implement mount of FIG. 11 by selling an optional add-on wheel and tongue-extension kit.

It will be appreciated that the implement mount may be used on any vehicle type to carry or tow any variety of implement types, and that though illustrated in a rear-mount or rear-tow context, the mounted versions in FIGS. 1 through 10 may alternatively be used in front mounted context at the front end of a suitability equipped vehicle. Also, while the illustrated embodiment shows the implement carrier 52 as having a female connector in the form of a female receiver tube 70, the type of connector may be varied or adapted according to the particular needs of an implement to be used with the mount in a particular scenario. Multiple implement carriers of varying connection type may be included, or sold as optional accessories, to allow a user to substitute one implement carrier for another according to their needs. Alternatively, optional adapters may be included or sold separately as optional accessories to convert a built-in implement carrier from one connection type to another.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. An implement mount for height adjustable mounting of an implement to a vehicle with a single-point hitch, said mount comprising:

a hitch coupler having a front end configured to mate with the single-point hitch of the vehicle to connect the mount thereto in a working position in which the hitch coupler reaches outward from the vehicle in a longitudinally rearward direction;

a guide frame affixed to the hitch coupler and defining at least one guide slot lying transversely cross-wise to the longitudinally rearward direction of the hitch coupler in an upright orientation at a distance spaced longitudinally rearward from the front end thereof;

at least one link arm pivotally supported on the hitch coupler in a manner pivotable relative thereto at a pivot point located intermediately between the at least one guide slot and the front end of the hitch coupler;

an implement carrier coupled to the at least one link arm proximate a rear end thereof at a spaced distance from the pivot point, said implement carrier carrying, or being configured to carry, the implement; and a follower arrangement that is attached to the at least one link arm proximate the rear end thereof, is engaged within the at least one guide slot, and is movable upwardly and downwardly inside the at least one guide slot on a constrained path imposed thereby, and is thereby operable to also constrain movement of the implement carrier to movement along said at least one guide slot;

wherein pivotal movement of the at least one link arm in a first direction lifting the rear end thereof upwardly is operable to lift the implement carrier along the at least one guide slot, and pivotal moment of the at least one link arm in a second direction lowering the rear end thereof is operable to lower the implement carrier along the at least one guide slot.

2. The implement mount of claim 1 wherein the at least one guide slot, and the constrained path imposed thereby, each comprise an upwardly and forwardly curved upper section at which the slot and the constrained path each deviate from a non-matching lower section thereof that resides below the upwardly and forwardly curved upper section and has a differently oriented profile than said upwardly and forwardly curved upper section.

3. The implement mount of claim 1 wherein said upwardly and forwardly curved upper section terminates at a closed upper end of the at least one guide slot.

4. The implement mount of claim 1 wherein opposing upper and lower ends of the at least one guide slot reside respectively above and below the hitch coupler.

5. The implement mount of claim 1 wherein the at least one link arm comprises two link arms disposed on opposite sides of the hitch coupler, said two link arms being coupled together at the pivot point and through the at least one guide slot.

6. The implement mount of claim 5 wherein the guide frame comprises two frame members disposed on said opposite sides of the hitch coupler, and the at least one guide slot comprises two guide slots respectively defined in said two frame members.

7. The implement mount of claim 1 comprising an actuator having a first pivotal connection to the at least one link arm proximate a front end thereof that resides across the pivot point from the rear end thereof, and a second pivotal connection to the guide frame above the hitch coupler, whereby extension of the actuator drives down the front end of the at least one link arm to raise the rear end thereof, and collapse of the actuator lifts up the front end of the at least one lift arm to lower the rear end thereof.

8. The implement mount of claim 7 wherein the actuator is manually powered.

9. The implement mount of claim 7 wherein the actuator is hydraulically powered.

10. The implement mount of claim 7 wherein the actuator is electrically powered.

11. The implement mount of claim 1 wherein the hitch coupler is telescopically adjustable in length in the longitudinal direction thereof to modify a distance by which hitch coupler reaches longitudinally from the vehicle.

12. The implement mount of claim 1 wherein the follower arrangement comprises at least one roller rotatably mounted on a follower pin engaged through the at least one guide slot from the at least one link arm.

13. The implement mount of claim 12 wherein the roller is constrained within a raised boundary wall protruding laterally outward from a face of the guide frame.

14. The implement mount of claim 1 wherein the at least one link arm comprises a mounting slot therein proximate the rear end thereof, and the implement carrier is coupled to the at least one link arm through the at least one guide slot and said mounting slot.

15. The implement mount of claim 14 wherein the implement carrier is pinned to the at least one link arm by a follower pin on which a roller is rotatably mounted in rolling contact with a slot-surrounding boundary that spans around said mounting slot.

16. The implement mount of claim 1 wherein the implement carrier is constrained to the at least one guide slot at two points to dictate an orientation of the implement carrier during movement thereof along the at least one guide slot.

17. The implement mount of claim 1 wherein the follower arrangement couples the at least one link arm to the implement carrier at one of said two points, and the implement carrier comprises an additional follower engaged with the at least one guide slot at the other of said two points.

18. The implement mount of claim 1 in combination with said vehicle and said single-point hitch, wherein the front end of the hitch coupler is in mated receipt with the receiver of the single-point hitch, and the mount is connected to the vehicle exclusively at said at mated receipt of the hitch coupler with said receiver of the single-point hitch.

19. The implement mount of claim 1 wherein the at least one guide slot penetrates the guide frame in a direction of laterally transverse relationship to the longitudinally rearward direction.

20. The implement mount of claim 1 wherein the guide frame comprises at least one upright plate through which the at least one slot penetrates in a direction of laterally transverse relationship to the longitudinally rearward direction.

* * * * *